United States Patent
Lin et al.

(10) Patent No.: US 10,909,300 B2
(45) Date of Patent: Feb. 2, 2021

(54) CREATING AND REUSING CUSTOMIZABLE STRUCTURED INTERCONNECTS

(71) Applicant: Synopsys, Inc., Mountain View, CA (US)

(72) Inventors: Hsiang-Wen Jimmy Lin, Menlo Park, CA (US); Friedrich Gunter Kurt Sendig, San Jose, CA (US); Mathieu Eric Drut, Santa Clara, CA (US); Philippe Aubert McComber, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/688,522

(22) Filed: Nov. 19, 2019

(65) Prior Publication Data

US 2020/0089835 A1    Mar. 19, 2020

Related U.S. Application Data

(63) Continuation of application No. 15/445,507, filed on Feb. 28, 2017, now Pat. No. 10,528,696.
(Continued)

(51) Int. Cl.
*G06F 17/50*    (2006.01)
*G06F 30/394*    (2020.01)
*G06F 115/06*    (2020.01)

(52) U.S. Cl.
CPC ........ *G06F 30/394* (2020.01); *G06F 2115/06* (2020.01)

(58) Field of Classification Search
CPC .................. G06F 30/33; G06F 30/27
See application file for complete search history.

(56) References Cited

U.S. PATENT DOCUMENTS

| 4,745,084 A | 5/1988 | Rowson et al. |
| 5,768,479 A | 6/1998 | Gadelkarim et al. |
| (Continued) | | |

OTHER PUBLICATIONS

PCT International Search Report and Written Opinion, PCT Application No. PCT/US2017/020046, dated May 8, 2017, 13 pages.
(Continued)

*Primary Examiner* — Nghia M Doan
(74) *Attorney, Agent, or Firm* — Fenwick & West LLP

(57) ABSTRACT

A customizable routing system allows designers to create custom connection layouts that can be stored, turned into templates, reused, and further customized. The system describes designer-input custom connection layouts in terms of "structural directives" that specify its patterns and properties instead of using precise dimensions. Structural directives may describe particular connection patterns between structural components (e.g., backbone or fishbone), the placement, width, direction or layer of specific structural components, and properties of structural components relative to other components. These structural directives are implemented generally during routing, such as through design constraints, which allows the router to locally optimize the design (e.g., for cost or wire length) while considering the structural intentions of the designer. The system can also learn and replicate customization patterns based on existing layout templates by comparing connectivity information to that of existing layout templates and applying applicable structural directives.

20 Claims, 13 Drawing Sheets

Related U.S. Application Data

(60) Provisional application No. 62/301,059, filed on Feb. 29, 2016.

(56) References Cited

U.S. PATENT DOCUMENTS

| | | |
|---|---|---|
| 5,995,734 A | 11/1999 | Saika |
| 6,066,179 A | 5/2000 | Allan |
| 6,920,620 B2 | 7/2005 | Hsiao et al. |
| 7,062,740 B2 | 6/2006 | Chen et al. |
| 7,612,599 B2 | 11/2009 | Motoyoshi et al. |
| 7,890,909 B2 | 2/2011 | Pyapali et al. |
| 8,276,110 B2 | 9/2012 | Baviskar et al. |
| 8,701,055 B1 | 4/2014 | Lee et al. |
| 2002/0029371 A1 | 3/2002 | Hwang et al. |
| 2003/0084418 A1 | 5/2003 | Regan |
| 2004/0225986 A1 | 11/2004 | Lin et al. |
| 2008/0092099 A1* | 4/2008 | Lin ............... G06F 30/392 716/122 |
| 2008/0134106 A1 | 6/2008 | Rivier-Cazaux |
| 2013/0219353 A1* | 8/2013 | Henrickson ....... G06F 30/392 716/122 |
| 2014/0123094 A1* | 5/2014 | Colwell ............. G06F 30/394 716/126 |

OTHER PUBLICATIONS

United States Office Action, U.S. Appl. No. 15/445,507, dated Aug. 27, 2018, 11 pages.
United States Office Action, U.S. Appl. No. 15/445,507, dated Feb. 1, 2019, 8 pages.
United States Office Action, U.S. Appl. No. 15/445,507, dated Jun. 27, 2019, 9 pages.

* cited by examiner

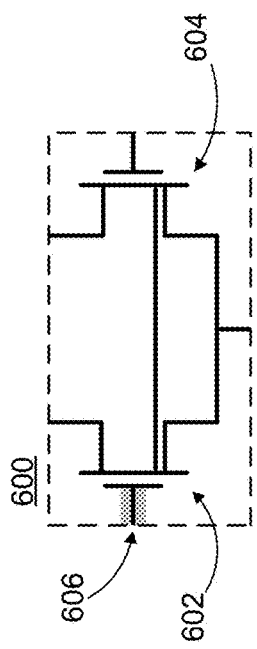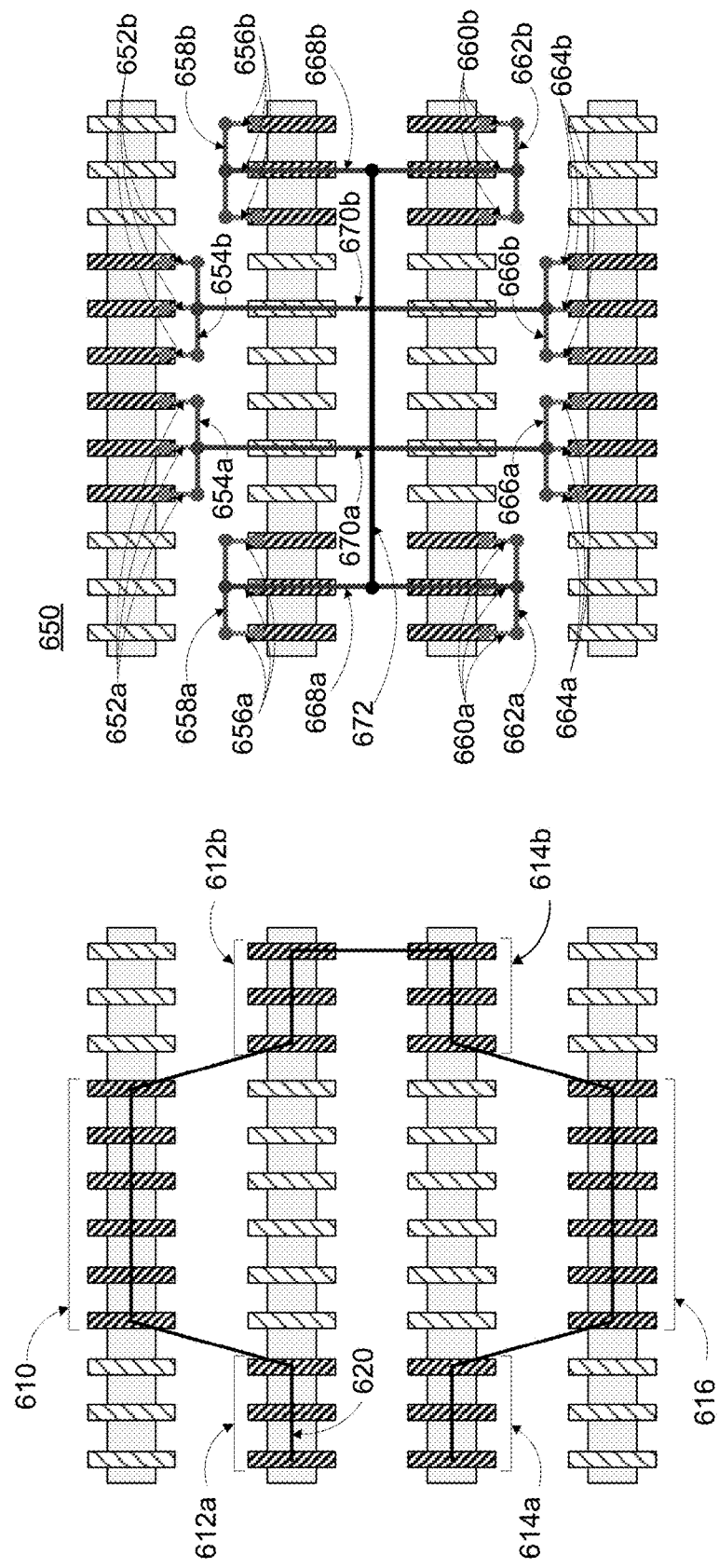
FIG. 6A
FIG. 6B
FIG. 6C

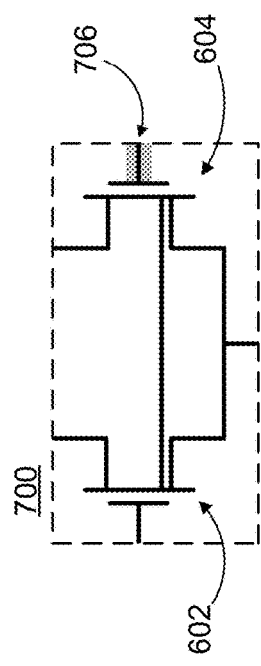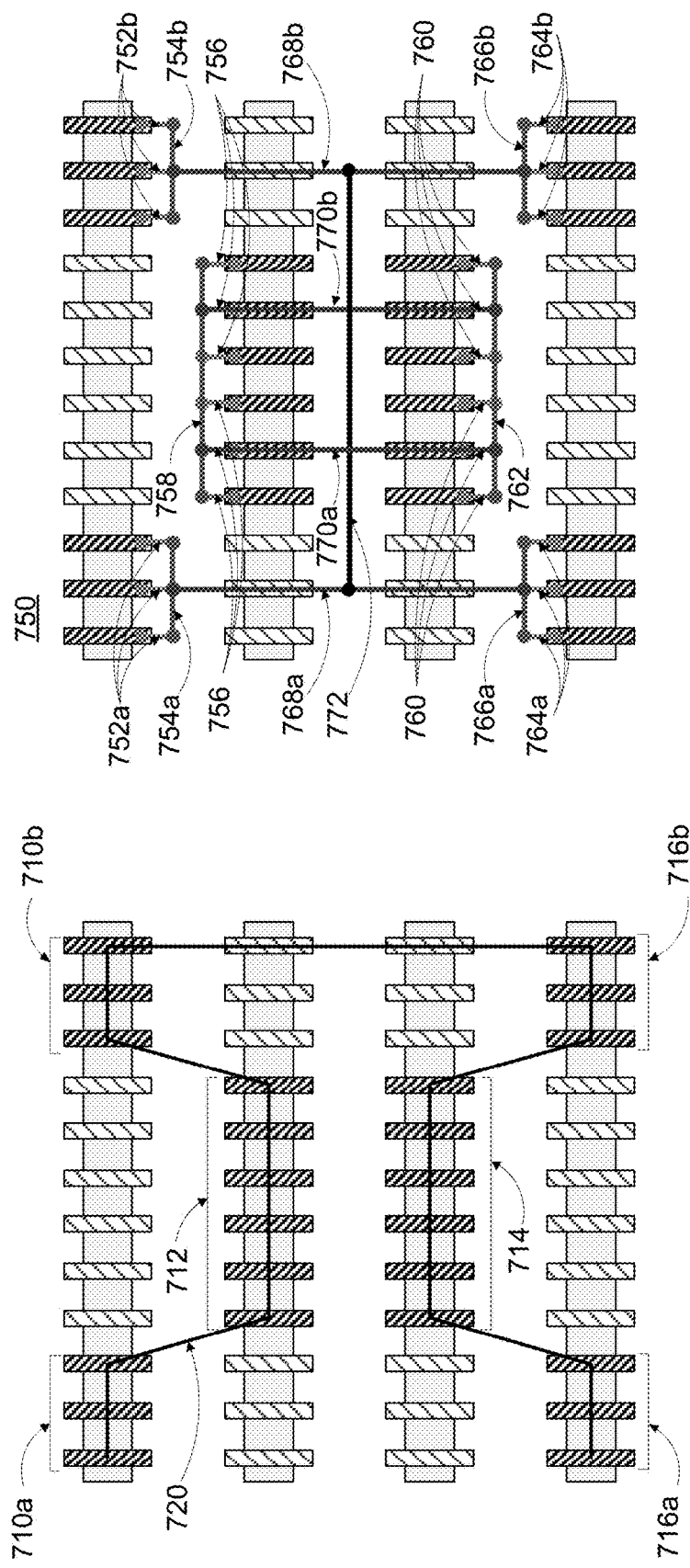
FIG. 7A
FIG. 7B
FIG. 7C

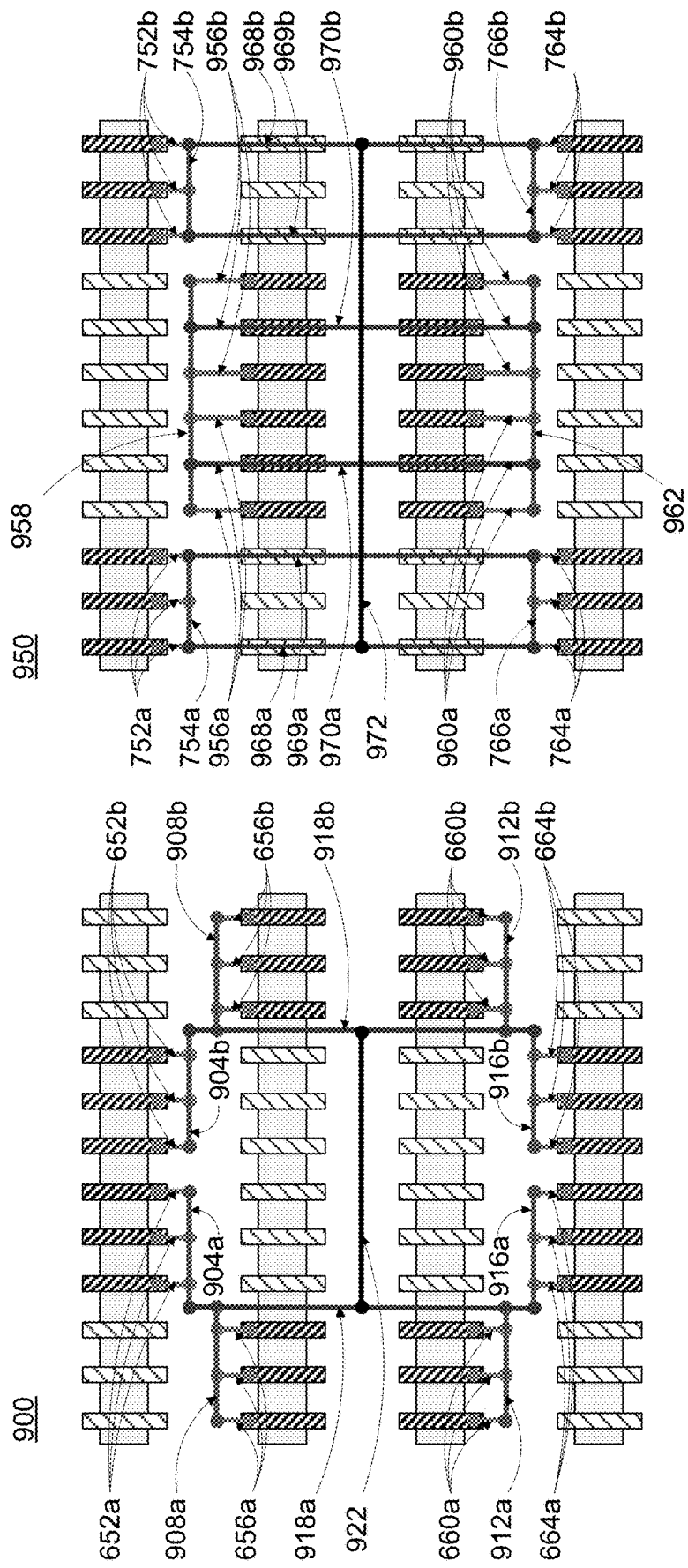

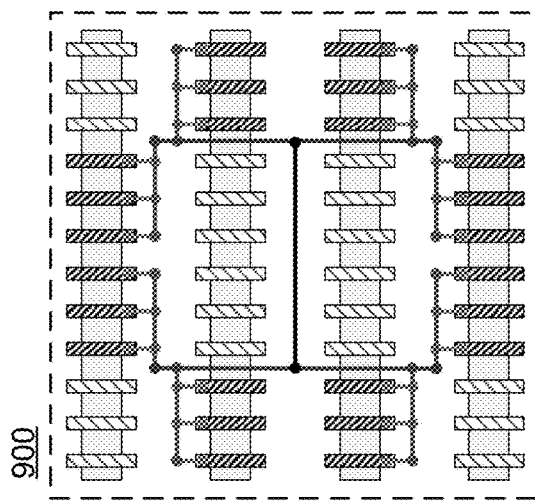
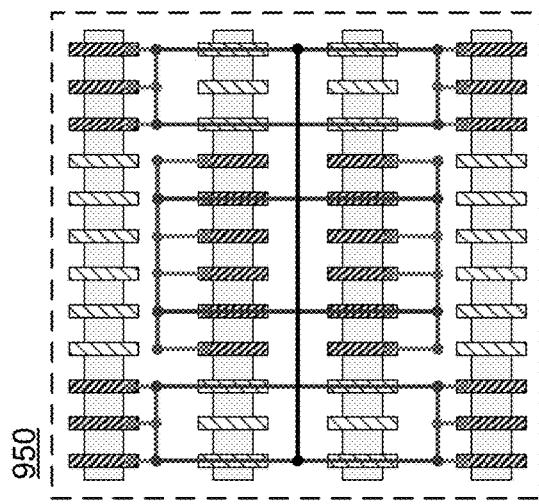
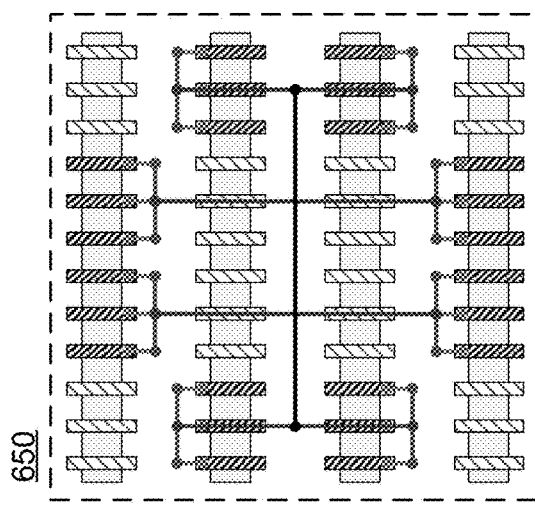
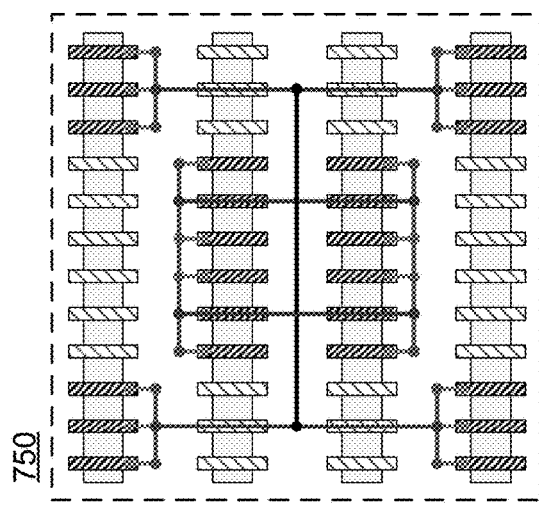
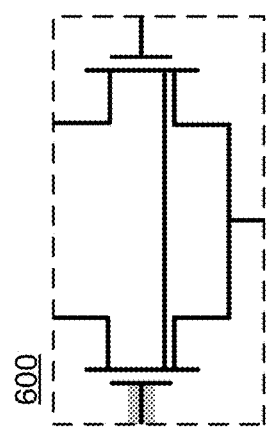
FIG. 10A
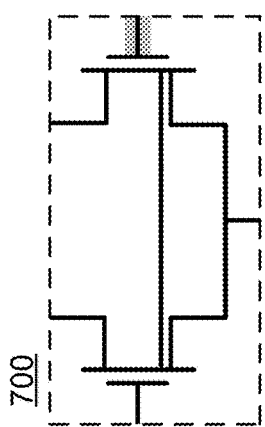
FIG. 10B

CREATING AND REUSING CUSTOMIZABLE STRUCTURED INTERCONNECTS

CROSS-REFERENCE TO RELATED APPLICATION

This application is a continuation of U.S. application Ser. No. 15/445,507, filed Feb. 28, 2017, now U.S. Pat. No. 10,528,696, which claims the benefit of U.S. Provisional Patent Application Ser. No. 62/301,059, entitled "Method to Create and Reuse Customizable Structured Interconnects" and filed on Feb. 29, 2016, all of which are hereby incorporated by reference in their entirety.

BACKGROUND

1. Field of the Invention

This disclosure relates generally to designing integrated circuits (ICs), and more specifically to reusable custom structured interconnect designs.

2. Description of Related Art

Routing is an integral part of the integrated circuit design, but due to the intractable nature of routing problems, batch routers rarely achieve a truly optimal result. Instead, they depend on heuristics to achieve a result that is "good enough," often focusing on objectives such as cost. Custom routes are often at odds with these objectives because they frequently require features that are not considered by batch routers, such as symmetry or redundancy. Redundancy in particular is a problem because it is inherently not "necessary" from the perspective of the batch router and thus is a cost that would be reduced. Because of this, customizable routing is generally performed manually, which is tedious and time-intensive. Furthermore, reusing carefully-crafted structured interconnects for similar layouts usually requires significant adjustments that are similarly time consuming.

SUMMARY

Embodiments relate to a customizable routing system that enables designers to create custom connection layouts, which can be stored, exported as templates, reused and customized. This saves designer's time by not requiring that each custom connection layout be manually constructed for each design or modified manually for similar but varying circuits. By describing designer-input custom connection layouts in terms of "structural directives" that specify its patterns and properties instead of using precise dimensions, the customizable routing system can generate layout templates that can be applied to similar designs or further customized in the future, in addition to being re-applied to the same design. This enables designers to make design modifications or follow structural principles of a previous design in another design with different connectivity information. Furthermore, the structural directives are implemented generally during the routing process, such as through design constraints, which allows the router to improve the design (e.g., for cost or wire length) while reflecting the structural intentions of the designer.

In one embodiment, the customizable routing system generates a custom layout connection by receiving connectivity information for one or more circuit elements and a user-defined layout illustrating the physical layout of connections between the one or more circuit elements. This connectivity information may take the form of a schematic or netlist. The user-defined layout includes initial structural components, and may be conveyed via interactive drawing in a graphical interface or an existing visual representation. The customizable routing system then extracts one or more structural directives from the user-defined layout, such as by analyzing the layout to determine one or more structural directives that can be used to describe the connection's physical structure. Each structural directive describes a property of the physical layout of connections between the one or more circuit elements, such as particular connection patterns between structural components (e.g., backbone or fishbone), the placement, width, direction or layer of specific structural components, and properties of structural components relative to other structural components. A structural directive may specify placement of a connection relative to one or more rows where at least one circuit element of the one or more circuit elements are arranged. For example, a connection may be placed closer to a corresponding row than the center of a channel between two rows of the one or more rows, or placed over a corresponding row of the one or more rows. The customizable routing system stores the one or more structural directives as a layout template for the received connectivity information, which can then be selected (and modified, if desired) and applied to future designs. The customizable routing system may further route the one or more circuit elements while maintaining the properties described by the structural directives.

In one embodiment, the customizable routing system learns and/or replicates customization patterns based on existing layout templates. Specifically, the customizable routing system stores one or more layout templates that each represent a physical layout of connections between one or more source circuit elements of a source circuit. Each layout template comprises structural directives describing properties of the corresponding physical layout of connections. The customizable routing system identifies one or more layout templates related to connectivity information for one or more target circuit elements of a target circuit. The connectivity information of the target circuit elements may match connectivity information for the one or more source circuit elements of at least one of the identified one or more layout templates. Alternatively, the connectivity information of the target circuit elements may be a scaled version of connectivity information adding or removing devices (that are in series or in parallel) of at least one of the identified one or more layout templates. A plurality of the identified one or more layout templates may represent a physical layout for the same one or more source circuit elements. The customizable routing system applies the structural directives of the identified one or more layout templates to the one or more target circuit elements of the target circuit for routing the one or more target circuit elements. The customizable routing system may apply the identified one or more layout templates by identifying one or more modifications to the layout templates, revising the structural directives of the identified one or more layout templates according to the one or more modifications and sending the revised structural directives for routing the one or more target circuit elements. The modifications may include adding one or more redundant connections. The modifications may be identified by determining one or more differences between the connectivity information of the one or more target circuit elements and connectivity information of the one or more source circuit elements of the identified one or more layout templates and then accounting for the one or more differences. The customizable routing system may further divide the connectivity information for the target circuit elements into a plurality of chunks, and each identified layout template of the one or more layout templates may correspond to one of the plurality of chunks.

BRIEF DESCRIPTION OF THE DRAWINGS

FIG. 6A is a schematic of a portion of an IC, according to a first embodiment.

FIG. 6B is a connectivity diagram corresponding to the portion of the IC in FIG. 6A, according to the first embodiment.

FIG. 6C is a layout diagram illustrating a custom connection layout corresponding to the connectivity diagram of FIG. 6B, according to the first embodiment.

FIG. 7A is a schematic of a portion of an IC, according to a second embodiment.

FIG. 7B is a connectivity diagram corresponding to the portion of the IC in FIG. 7A, according to the second embodiment.

FIG. 7C is a layout diagram illustrating a custom connection layout corresponding to the connectivity diagram of FIG. 7B, according to the second embodiment.

FIGS. 9A and 9B are layout diagrams illustrating a custom connection layout that have been further customized for reuse, according to one embodiment.

FIGS. 10A and 10B are diagrams illustrating sets of custom layout templates and their corresponding portions of an IC shown in schematics, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiment relate to a layout template that includes structural directives describing particular connection patterns between structural components, the placement, width, direction or layer of specific structural components, and properties of structural components relative to other components. The template may be generated by a user or generated automatically by analyzing a physical layout of connections between source circuit elements of a source circuit. The layout template can be applied without modification or with modification to target circuit elements of a target circuit for performing routing between the target circuit elements.

A circuit element described herein refers to an element in a circuit layout. The circuit element may be an active circuit element (e.g., transistor) or a passive circuit element (e.g., resistor, capacitor and inductor).

A structural component described herein refers to tap-offs, trunks, and spines that create physical connections between pins of circuit elements. A tap-off refers to a connection directly extending to or from a pin. A trunk refers to a connection that is connected to a plurality of pins. A spine connects trunks and/or other spines.

Overview of EDA Design Flow

Figure 1:
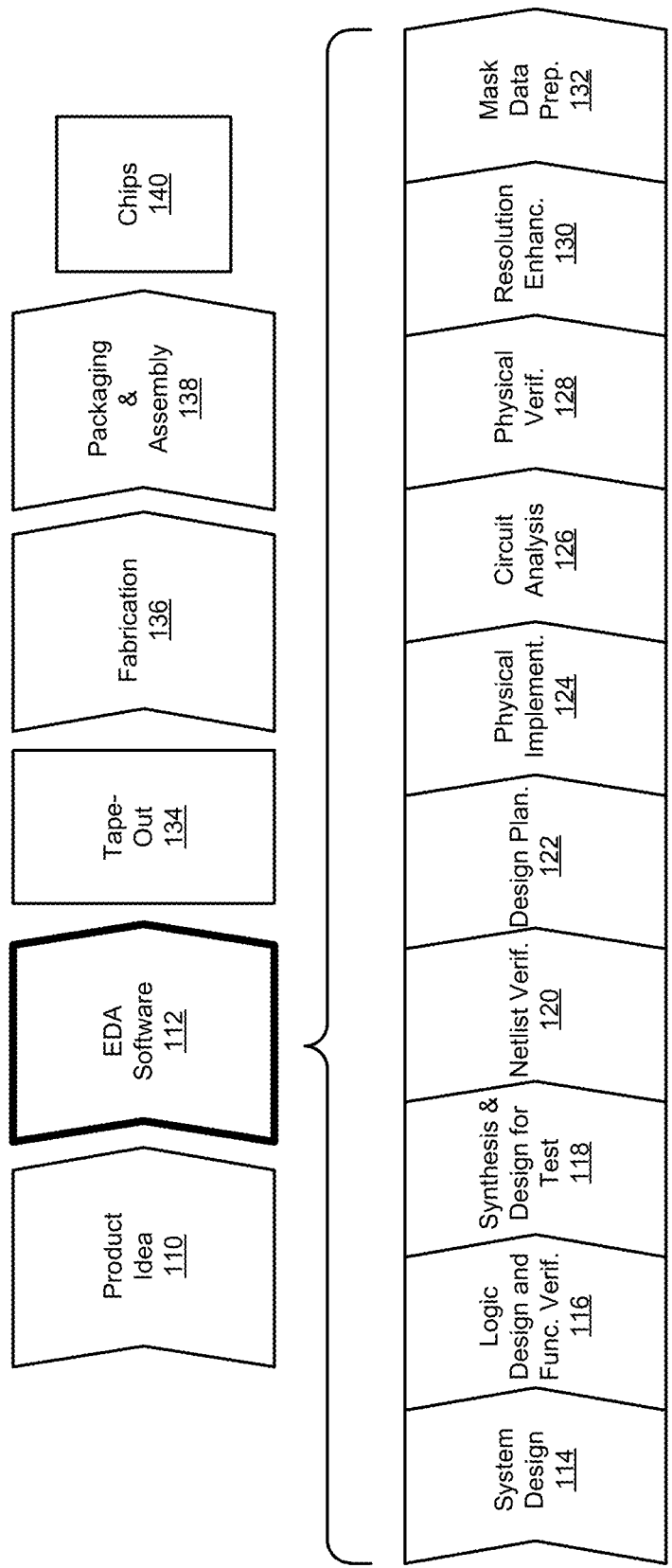
FIG. 1 is a flowchart illustrating various operations for designing and fabricating an integrated circuit (IC), according to one embodiment.

FIG. 1 is a flowchart illustrating various operations for designing and fabricating an integrated circuit, according to one embodiment. The design process 100 starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

Figure 2:
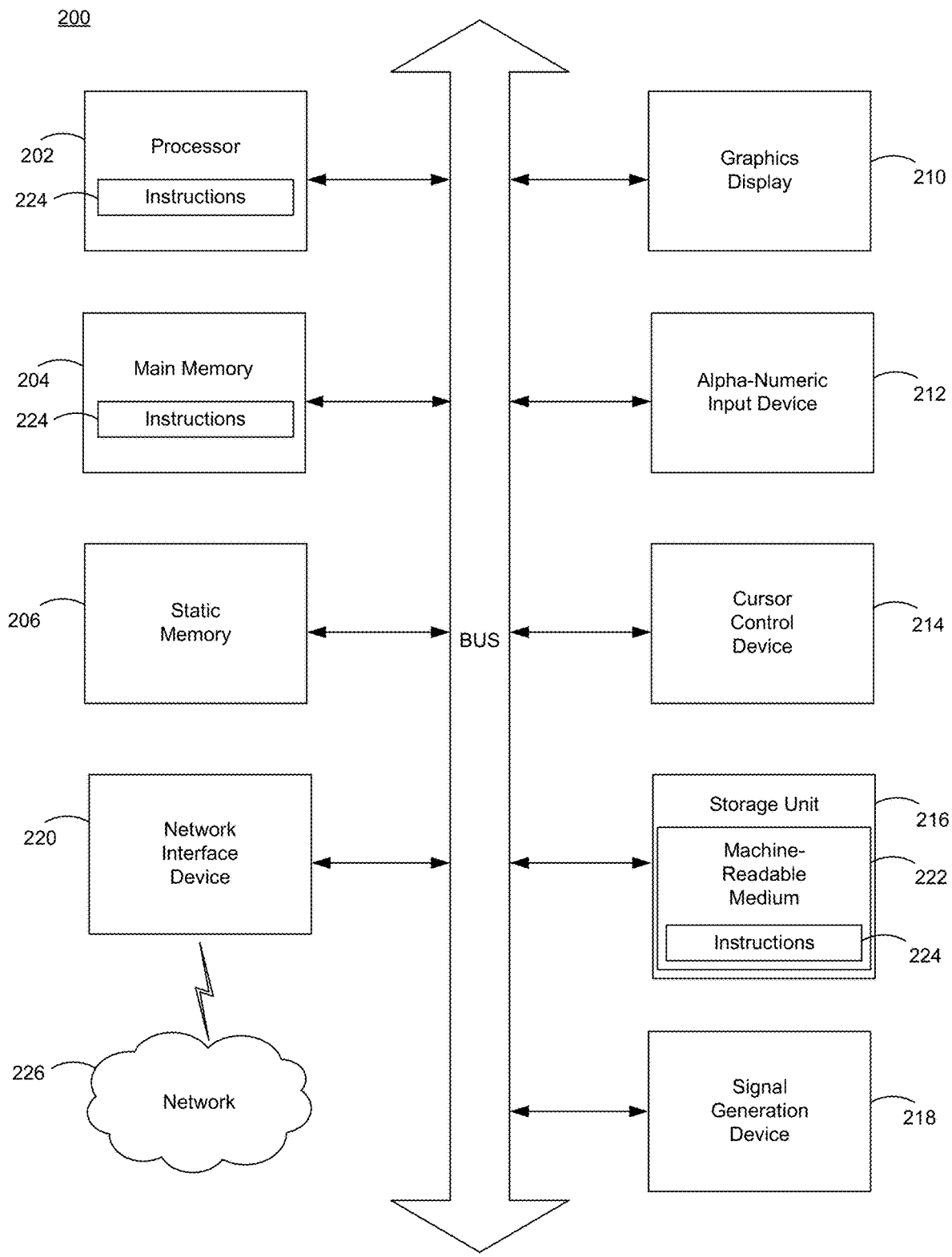
FIG. 2 is a high-level block diagram illustrating an example of a computing device for performing custom designing of an IC, according to one embodiment.

The EDA software 112 may be implemented in one or more computing devices such as the computing device 200 of FIG. 2. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: Custom Compiler®, the Astro® and IC Compiler® products. Embodiments described herein relate primarily to the physical implementation 124.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products. Formal verification may be performed at the stage of logic design and functional verification 116. Low power design specification is typically processed during stages synthesis and design for test 118 or netlist verification 120.

Embodiments of the present disclosure can be used during one or more of the above-described stages. Specifically, embodiments may be used for the processes of design planning 122 and physical implementation 124.

Computing Device Overview

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Customizable Routing System

Figure 3:
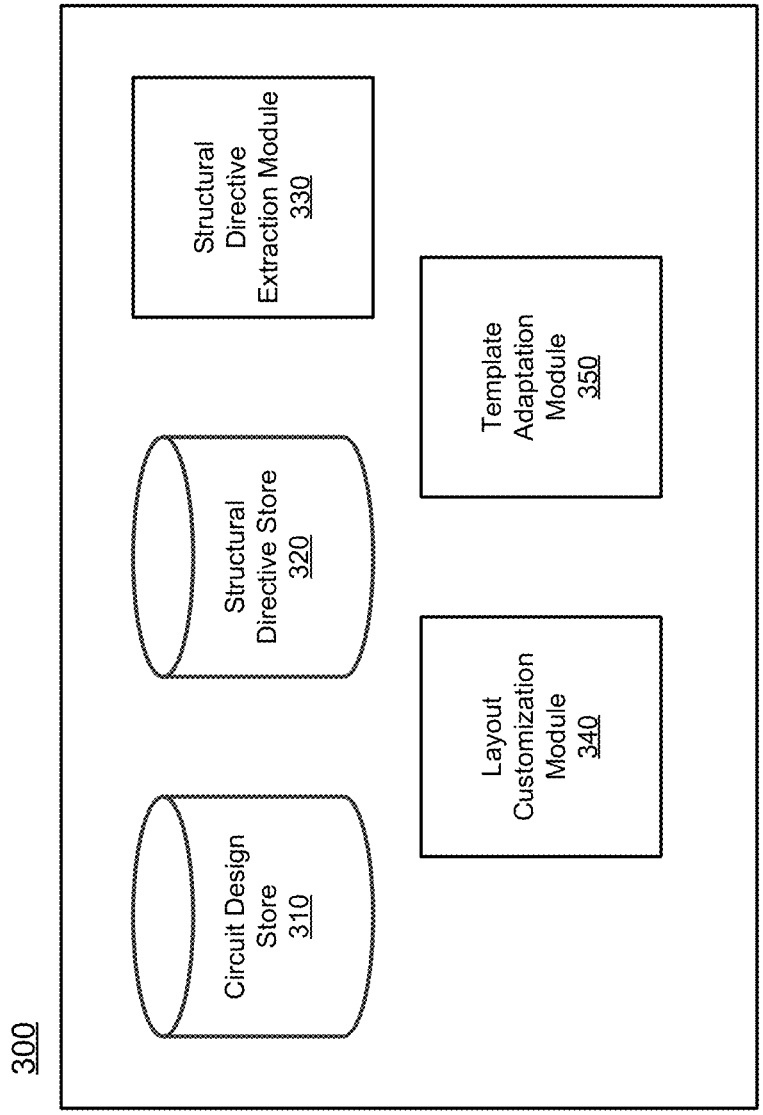
FIG. 3 is a block diagram illustrating an architecture of a customizable routing system, according to one embodiment.

FIG. 3 is a block diagram illustrating an architecture of a customizable routing system 300, according to one embodiment. The customizable routing system 300 enables users (designers) to design custom structured interconnects that can then be fabricated via batch routing processes or non-batch routing processes. The customizable routing system 300 shown in FIG. 3 includes a circuit design store 310, a structural directive store 320, a structural directive extraction module 330, a layout customization module 340, and a template adaptation module 350. In other embodiments, the customizable routing system 300 may include additional, fewer, or different components for various applications. Each of the aforementioned components may be embodied as modules in memory 204 of a computer of the customizable routing system 300. Conventional components such as network interfaces, security functions, load balancers, failover servers, management and network operations consoles, and the like are not shown so as to not obscure the details of the system architecture.

The circuit design store 310 is a database that stores physical layout data for one or more circuits. Physical layout data for a particular circuit includes a (physical) connection layout, a schematic, schematic-layout mapping information, a number of metal layers to be used, and physical processes associated with fabricating the circuit. The connection layout is a visual representation of the physical placement of connections between pins of a circuit. FIGS. 4A through 4E, 6B, 6C, 7B, 7C, 9A, 9B, 10A, 10B, 12B, and 13B include examples of connection layouts, as described below in detail. Schematic-layout mapping information may indicate the grouping of pins of one or more circuit elements into one or more subsets of pins, and correspondence of pins in the one or more circuit elements to other pins in the one or more circuit elements.

The circuit design store 310 also stores "layout templates," which are sets of structural directives (described in conjunction with the structural directive store 320 below) describing a particular connection layout in association with the corresponding connectivity information. Connectivity information indicates which pins are connected and can be derived by schematics and schematic-layout mapping information or directly provided in the form of a netlist or other similar indication. Although the circuit design store 310 is described as a part of the customizable routing system 300, the circuit design store 310 may be part of another system outside of the customizable routing system 300. For example, the circuit design store 310 may be embodied as an OpenAccess database.

The structural directive store 320 is a database that stores "structural directives" describing the general physical structure and placement of connections in a connection layout. A batch routing system (which may be part of the customizable routing system 300 or may be a separate system) can interpret and apply the structural directives, such as by making them design constraints. Structural directives, for example, may describe a connection pattern within a row, or across several rows. Structural directives may further describe properties of the structural components themselves, such as direction, width, placement (such as on an axis parallel to the structural component), and metal layer. Structural directives may further indicate the types of pins that are being connected, such as diffusion, poly, or a combination thereof. Structural directives are discussed in further detail in conjunction with FIGS. 4A through 4E.

The structural directive extraction module 330 extracts structural directives from connection layouts. To do this, the structural directive extraction module 330 matches the connection layout to known patterns that are associated with structural directives. For example, the structural directive extraction module 330 may analyze the physical shapes present in a connection layout in conjunction with the logical connectivity and process data to determine the direction (e.g., upwards, downwards, towards a central axis) the tap-offs should extend from the pins of the devices, how many trunks (e.g., a single trunk, one trunk for every three pins) should be used to connect the tap-offs in a row, and where the trunk(s) should be located relative to the row (e.g., along a central axis, offset from the central axis in a direction toward or away from the row).

The layout customization module 340 generates custom connection layouts and layout templates. To generate a custom connection layout "from scratch," the layout customization module 340 receives structural components from a designer, such as through drawings (e.g., existing layout data or in a graphical interface of the customizable routing system 300) or textual commands. The structural components are organized into a custom connection layout. To generate a custom connection layout based on an existing layout template, the layout customization module 340 retrieves the layout template and receives modifications to the structural components from the designer. The layout customization module 340 then generates a modified connection layout based on the connection layout from the retrieved layout template and the user modifications. The layout customization module 340 can further generate a layout template from either type of custom connection layout described above by storing the extracted structural directives in association with the corresponding logical structure (e.g., a schematic snippet) in the circuit design store 310 for future use. In either scenario, structural directives associated with the connection layout can additionally or alternatively be sent for batch routing the corresponding circuit elements.

The template adaptation module 350 generates connection layouts based on adaptations made to existing layout templates. For example, a target circuit may have similar connectivity information to one or more source circuits that are already associated with layout templates. Rather than requiring the designer to create another connection layout for the target circuit from scratch, the template adaptation module 350 automatically modifies (if necessary) and applies the structural directives of an existing layout template to the target circuit to create a connection layout.

The template adaptation module 350 adapts layout templates by recognizing pattern similarities while not requiring an identical physical structure. For example, a layout template created from FIG. 4A (discussed further below) denotes a structure of two rows with one trunk in the channel beneath each row. For a structure with four rows that has similar device patterns, the template adaptation module 350 would determine that four trunks were desired, each placed in the channel below one of the four rows. Other adaptations performed by the template adaptation module 350 include extending the number of devices per row, and adjusting trunk or spine placement to fit a design with a different number of tracks. In some embodiments the template adaptation module 350 could receive mapping guidance between technologies to guide the adaptation. For example, the original layout template might specify geometric dimensions and/or process layers relative to a specific technology. An external mapping specification describing how layers of a target circuit correspond to those of a source circuit associated with the original layout template, and providing dimensional shrink guidance could be applied to map the corresponding portions of the original layout template to the target circuit.

In some embodiments, the designer is able to further customize the adapted connection layout through the layout customization module 340. Either (or both) of the adapted connection layout or the further customized connection layout can also be stored as layout templates. Adapting layout templates is further discussed below in conjunction with FIGS. 11 through 13B.

Connection Layout Properties and Structural Directives

Structural directives describe the general structural features of structural components in a connection layout and can be categorized based on which aspects of the structural components they describe. For example, the structural directives discussed below can be grouped into structures, properties, and patterns. Structural directives describing structures indicate how structural components connect, structural directives describing properties specify characteristics of the structural components themselves, and structural directives describing patterns indicate how the structural components are organized across multiple rows of pins. The structural directives described below are merely examples to indicate how structural directives correspond to connection layouts and are not limiting. Other embodiments or implementations may use other structural directives to describe similar or additional structural components of connection layouts. Similarly, other embodiments or implementations may describe other structural features in lieu of or in addition to the specific structural features discussed below. Structural directives are indicated below in curly braces (i.e., { }), and can be separated by semicolons to delineate between rows.

FIGS. 4A through 4E are layout diagrams of example FinFETs that correspond to various structural directives, according to one embodiment. Each of the examples 400a through 400e includes 16 pins of FinFETs that are represented as vertical rectangles. The 16 pins are organized into two rows of eight pins each, referred to as a "top row" (i.e., the upper FinFET) and a "bottom row" (i.e., the lower FinFET). The top row and the bottom row are separated by a middle channel that does not contain any pins. In some of the examples 400a through 400e, there is also a bottom channel below the bottom row that similarly does not contain any pins. The darkened pins in both rows represent those that are to be connected. The four middle pins in the top row are darkened and are referred to as the "top pins." The two outermost pins on each side of the bottom row (i.e., four pins total) are also darkened and are referred to as the "bottom pins." Some of the examples 400a through 400e do not explicitly show the top pins connected to the bottom pins. In practice, the trunk(s) of the top pins and the trunk(s) of the bottom pins may be connected by one or more spines. These spines connecting the top pins and the bottom pins have been omitted for simplicity.

Figure 4A:
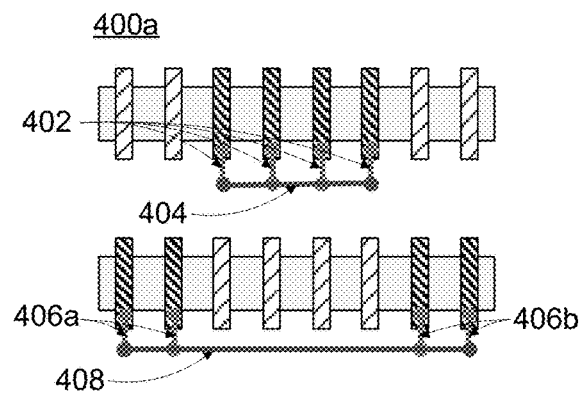
FIGS. 4A through 4E are visual representations of example connection layouts that correspond to various structural directives, according to one embodiment.
Figure 4B:
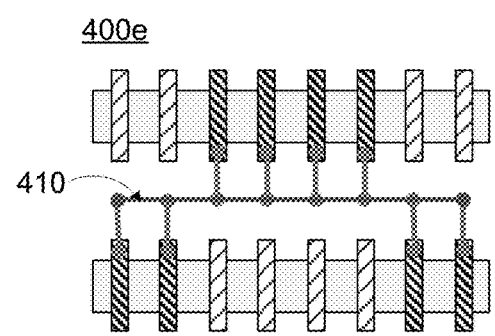
Figure 4C:
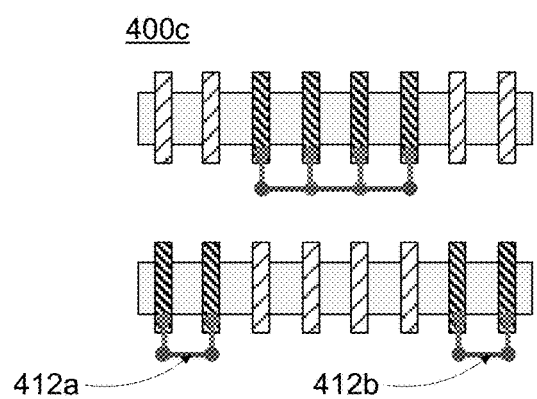
Figure 4D:
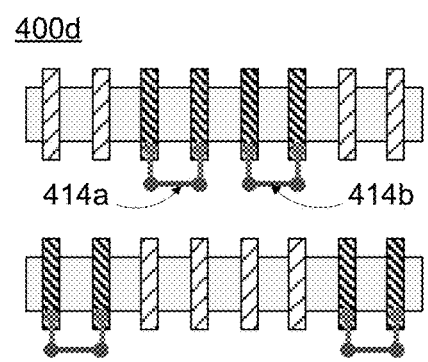

FIGS. 4A through 4D illustrate examples of structures described by structural directives. FIGS. 4A and 4B are examples of primary structures {backbone} and {fishbone}, respectively. FIGS. 4C and 4D are examples of structure modifications {intermittent} and {match} that can be applied to primary structures. {backbone}, {fishbone}, {intermittent}, and {match} are all structural directives that can be used to describe trunks, and in some embodiments, they may also be used to describe spines.

Example 400a of FIG. 4A illustrates a {backbone} structure, which is characterized by tap-offs extending from only one side of the trunk. Tap-offs 402 extend from the four top pins into the middle channel and are connected to a single trunk 404 in the middle channel. Tap-offs 406a extend from the two leftmost bottom pins into the bottom channel. Tap-offs 406b extend from the two rightmost bottom pins into the bottom channel. Tap-offs 406a and 400b all connect to a single trunk 408 in the bottom channel. Trunks 404 and 408 have tap-offs 402 and 406a and 406b (respectively) on only one side, and thus would be described by the structural directive {backbone}. Note that an unmodified {backbone} structure includes a single trunk (e.g., 404 and 408) per row of pins, even if the pins are not located adjacently (e.g., the bottom pins).

Example 400b of FIG. 4B illustrates a {fishbone} structure, which is characterized by tap-offs extending from both sides of the trunk. Like in example 400a, tap-offs 402 extend downward from the four top pins and connect to a single trunk 410 in the middle channel. However, unlike in example 400a, tap-offs 406a and 406b of the bottom pins extend upward from the four bottom pins into the middle channel and connect to the same trunk 410 that the top pins are connected to. Trunk 410 has tap-offs extending from both sides to connect to pins on both the top row and the bottom row, and thus would be described by the structural directive {fishbone}.

Example 400c of FIG. 4C illustrates an {intermittent} modification to a {backbone} structure. The {intermittent} modification is characterized by definition of the number and placement of the trunks based on groups of adjacent pins. The connections of the top pins of example 400c match those of example 400a, but the connections of the bottom pins now include two separated trunks 410a and 410b in the bottom channel instead of a single trunk 408. In example 400a, the single trunk 408 spans the entire length of the bottom channel, including four pins that are not being connected, to connect the two leftmost bottom pins to the two rightmost bottom pins. However, the {intermittent} modification splits up the single trunk 408 into multiple trunks 412a and 412b that each only span the portion of the bottom channel corresponding to group of adjacent pins they connect. Specifically, the two leftmost bottom pins are adjacent, so the corresponding tap-offs 406a are connected to one trunk 410a, and the two rightmost bottom pins are adjacent, so the corresponding tap-offs 406b are connected to another trunk 410a. Unlike in example 400a, here the second leftmost and the second rightmost bottom pins are not connected via a trunk.

In some embodiments, the pins need not be directly adjacent to (i.e., literally next to) each other to be considered adjacent for the purposes of grouping. For example, pins that are within four pins of each other may be considered adjacent and be connected to the same trunk in an {intermittent} structure. Additionally, adjacency may only apply in the horizontal direction, in some cases, such that pins in different rows are considered "adjacent" if they are in adjacent columns. Thus, a trunk connecting pins in multiple rows (e.g., a {fishbone} structure) might be broken up into multiple trunks according to the {intermittent} modifier. The {intermittent} modifier may also have no effect on some trunks, such as that of the top row in example 400c. When all of the pins connected to the trunk are located adjacently (e.g., the top pins), there is no need to introduce multiple trunks, making an {intermediate backbone} structure indistinguishable from an unmodified {backbone} structure.

Example 400d of FIG. 4D illustrates a {match} modification to a {backbone} structure. The {match} modification is characterized by a common trunk length for all of the trunks in the connection layout being defined by the shortest trunk (e.g., the trunk connecting the smallest group of adjacent pins). The only difference between example 400d and example 400c is that the single trunk 404 of example 400c is replaced with two trunks 414a and 414b to match the trunk length of trunks 412a and 412b in the bottom row, which are connecting the smallest groups of adjacent pins. Similar to the {intermittent} modification, the {match} modification may be indistinguishable from other structures in some cases. For example, the {match backbone} structure is indistinguishable from the {intermittent backbone} structure when looking at just the bottom rows of examples 400c and 400d.

Figure 4E:
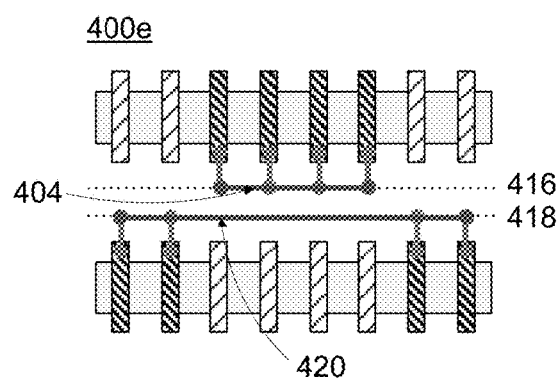

Property structural directives can differ from other structural directives because rather than being a set of rules applied to a group of structural components, property structural directives reflect a specific value of the structural element(s). Example 400e of FIG. 4E illustrates specification of the <track> property for trunks in a {backbone} structure. The <track> property specifies the "track" of the channel on which the trunk(s) associated with the row are placed. The <track> property is specified relative to the total number of tracks available, counting from the top. In example 400e, there is a first track 416 and a second track 418. Trunk 404 runs along the first track 416, so it would be described by structural directive {track 1/2}. Trunk 420 runs along the second track 418, so it would be described by the structural directive {track 2/2}. If an invalid value is input for the <track> property, the customizable routing system 300 may round the value to the closest valid value (e.g., when adapting a layout template). For example, if {track 3/5} is input for a channel that only has three tracks, it would be rounded to {track 2/3}. In some embodiments, {over} can be added to the <track> property to indicate that the tracks are over the row of pins, rather than in the channel. For example, the structural directive {over track 1/3} describes a trunk that is on the first track of three tracks that are placed over the row of pins.

Other properties include <row>, <width>, and <layer>. The <row> property specifies how many rows of pins are connected to the trunk across one or more channels. For example, {row all} indicates that pins in all of the rows of the connection layout are connected to a single trunk, whereas {row 2} indicates that pins in the first two rows (from the row that the structural directive applies to) are connected to a single trunk. The <row> property can also be used to specify whether the trunk is located above the rows being connected (described by {row up}) or below the rows being connected (described by {row down}). The <width> property indicates a width of a trunk. For example, {width 0.2} indicates that the width of the trunk should be 20% of the default width. The <layer> property indicates the metal layer in which the trunk is to be fabricated. For example, one trunk may be specified to be {layer M2} while another is specified to be on {layer M1}.

Although the examples above discuss the structural directives with respect to trunks, some may also apply to spines, or even tap-offs. For example, the <width> and <layer> properties may additionally apply to tap-offs and spines. Additionally, spines may have additional structural directives that describe properties, such as <column> (similar to <row> for trunks relative to tap offs), or <direction> (e.g., {horizontal} or {vertical}). Furthermore, general properties such as <offset> may be applied to any structural element.

Returning to FIG. 4E, example 400e also shows an example of a {mirror} pattern. The {mirror} pattern is characterized by reflection about a horizontal axis and affects the placement of trunks in the channels either above or below the row of pins that they are connecting. As noted in conjunction with the explanation of the <track> property, trunk 420 connects the bottom pins and is located on the second track in the middle channel. In the other examples 400a through 400d, the trunk(s) connecting the bottom row of pins are located in the bottom channel, which is the default behavior in these examples 400a through 400e. Because example 400e includes {mirror} pattern, the structural components for the bottom pins (tap-offs 406a and 400b, and trunk 420) are reflected across an axis in through the center of the middle channel. This example is described by the structural directive {backbone mirror}.

The {mirror} pattern also applies any structures or properties included in the row that is the basis for the mirroring to the mirrored row. For example, the structural directives {intermittent backbone layer M1 width 0.5 mirror} would result in a first row that could also be described by {intermittent backbone layer M1 width 0.5} and a second row described by {intermittent backbone row 1 up layer M1 width 0.5}, which can be combined as {intermittent backbone layer M1 width 0.5; intermittent backbone row 1 up layer M1 width 0.5}.

The {mirror} pattern can also be used for multiple-row patterns, which is represented as {mirror} being used as on its own line (i.e., after a semicolon). When using the {mirror} pattern for multiple rows, any other row-based patterns are reflected about an axis through the central channel of the connection layout. If there are fewer specified row patterns than there are rows before the central axis, the specified row patterns repeat. For example, if {backbone row 1 up; intermittent backbone row 1 down; mirror} were to be applied to a connection layout with six rows, the first row would be {backbone row 1 up}, the second row would be {intermittent backbone row 1 down}, the third row would be {backbone row 1 up}, the fourth row would be {backbone row 1 down}, the fifth row would be {intermittent backbone row 1 up}, and the sixth row would be {backbone row 1 down}.

Creating a Connection Layout Template

Figure 5:
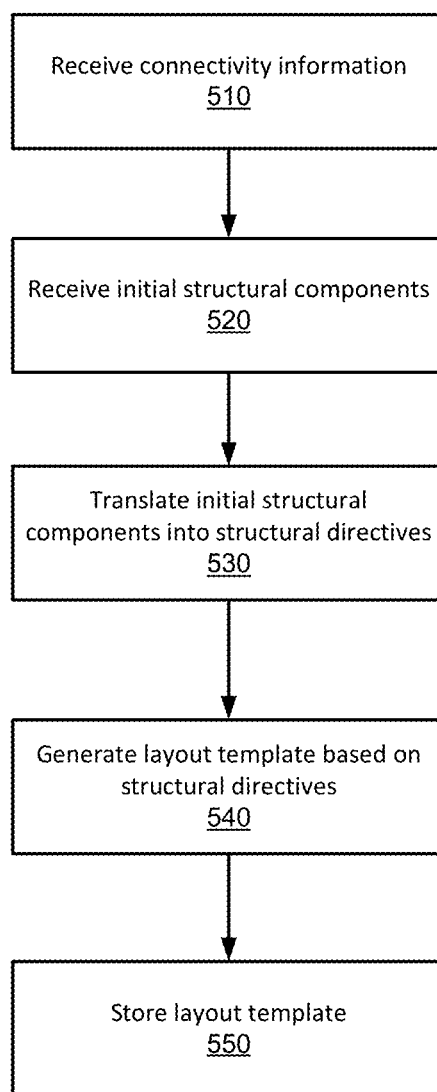
FIG. 5 is a flowchart illustrating a method for creating a layout template, according to one embodiment.

FIG. 5 is a flowchart illustrating a method 500 for creating a layout template, according to one embodiment. FIGS. 6A through 6C and 7A through 7C illustrate two example applications of method 500 of FIG. 5. The customizable routing system 300 receives 510 connectivity information for a plurality of circuit elements for which the structured interconnects are being designed. The connectivity indicates which pins of the plurality of circuit elements should be connected. The connectivity information may be conveyed to the customizable routing system 300 in the form of a schematic and corresponding schematic-layout mapping information. Alternatively, a designer may manually select pins or input a matrix (or other similar representation) indicating the pins to be connected.

The customizable routing system 300 receives 520 the initial structural components for the connection layout, such as from a designer, to form the custom connection layout. The designer may draw the initial structural components (e.g., trunks and tap-offs in FIG. 4A through 4E) through an interface of the customizable routing system 300, or submit another type of visual representation. In some embodiments, the connectivity information and initial structural components may be received 510 and 520 together, such as through a detailed drawing.

The customizable routing system 300 then translates 530 the initial structural components into structural directives. This translation 530 can be done by analyzing patterns in the custom connection layout and matching them to similar known patterns that are described by structural analysis. The customizable routing system 300 then generates 540 a layout template by associating the structural directives of the custom connection layout and the connectivity information, which is stored 550 for future use. Future use can include direct re-use (e.g., applying the custom connection layout template to the same design), indirect re-use (e.g., applying the custom connection layout template to a similar design without performing any modifications), or customized re-use, which are described by methods 800 and 1100 with reference to FIGS. 8 and 11, respectively.

FIG. 6A illustrates a schematic 600 of a portion of an IC, and FIG. 6B is a connectivity diagram of a physical representation corresponding to the schematic 600, according to a first embodiment. The schematic 600 includes two transistors 602 and 604, with the gate connection 606 of transistor 602 highlighted to indicate that it is the connection to which the connection layout corresponds. The connectivity diagram of FIG. 6B is a visual representation of four rows of pins that are separated by first, second, and third channels, respectively. Line 620 reflects the connectivity information and indicates that pins 610, 612a, 612b, 614a, 614b, and 616 are to be connected. These pins have been darkened to distinguish them from pins that do not need to be connected in this example.

FIG. 6C is a custom connection layout 650 corresponding to the connectivity diagram of FIG. 6B, according to the first embodiment. In the first row, tap-offs 652a extend downward from the three leftmost pins 610 to connect to a trunk 654a in the first channel, and tap-offs 652b extend downward from the three rightmost pins of pins 610 to connect to a trunk 654b in the first channel. Trunks 654a and 654b are both located on the first track, {track 1/2}, in the first channel. In the second row, tap-offs 656a extend upward from pins 612a to connect to trunk 658a in the first channel, and tap-offs 656b extend upward from pins 612b to connect to trunk 685b in the first channel Trunks 658a and 658b are both located on the second track, {track 2/2}, in the first channel. In the third row, tap-offs 660a extend downward from pins 614a and connect to trunk 662a in the third channel, and tap-offs 660b extend downward from pins 614b and connect to trunk 662b in the third channel. Trunks 662a and 662b are both located on the first track, {track 1/2}, in the third channel. In the fourth row, tap-offs 664a extend upward from the three rightmost pins 616 to connect to trunk 660a in the third channel, and tap-offs 664a extend upward from the three rightmost pins 616 to connect to trunk 666b in the third channel. Trunks 666a and 666b are both located on the second track, {track 2/2}, of the third channel. Trunks 658a and 662a are connected via spine 668a, trunks 654a and 660a are connected via spine 670a, trunk 654b and 660b are connected via spine 670a, and trunks 658b and 662b are connected via spine 668b. Spines 668a, 668b, 670a and 670b are connected by a horizontal spine 672.

Connection layout 650 is described by the structural directives {match backbone mirror}. Each trunk 654a, 654b, 658a, 658b, 662a, 622b, 666a and 666b only has tap-offs extending from one side, making it a {backbone} structure. Additionally, each trunk 654a, 654b, 658a, 658b, 662a, 662b, 666a and 666b has the same length, which is the length of trunks 658a, 685b, 662a, and 662b because they are connected to the smallest group of pins (i.e., three pins), resulting in the {match} modification. Finally, the trunk placement in the second row is a reflection of the trunk placement in the first row across an axis through the center of the first channel, which is a {mirror} pattern. More generally stated, trunks 654a, 654b are on track x/n in the channel below the corresponding row (the first channel), and trunks 656a, 656b are on track (n−x+1)/n in the channel above the corresponding row (the first channel). The third and fourth rows then have the same properties as the first and second rows, which does not need to be explicitly described because the structural directives automatically repeat. Connection layout 650 can also be described more explicitly by other structural directives, such as {match backbone row 1 down track 1/2; match backbone row 1 up track 2/2}.

FIG. 7A is a schematic 700 of a portion of an IC, and FIG. 7B is a connectivity diagram corresponding to a physical implementation of schematic 700, according to a second embodiment. The schematic 700 includes two transistors 602 and 604, with the gate connection 706 of transistor 604 highlighted to indicate that it is the connection for which the connection layout is being designed. The connectivity diagram of FIG. 7B is a visual representation of four rows of pins that are separated by first, second, and third channels, respectively. Line 720 reflects the connectivity information and indicates that pins 710a, 710b, 712, 714, 716a and 716b are to be connected. These pins have been darkened to distinguish them from pins that do not need to be connected in this example.

FIG. 7C is a custom connection layout 750 corresponding to the connectivity diagram of FIG. 7B, according to the second embodiment. In the first row, tap-offs 752a extend downward from the three leftmost pins 610a to connect to a trunk 754a in the first channel, and tap-offs 752b extend downward from the three rightmost pins of pins 710 to connect to a trunk 754b in the first channel. Trunks 754a and 754b are both located on the first track, {track 1/2}, in the first channel. In the second row, tap-offs 756 extend upward from pins 712 to connect to trunk 758 in the first channel. Trunk 758 is located on the second track, {track 2/2}, in the first channel. In the third row, tap-offs 760 extend downward from pins 714 and connect to trunk 762 in the third channel. Trunk 662 is located on the first track, {track 1/2}, in the third channel. In the fourth row, tap-offs 764a extend upward from the three leftmost pins 616a to connect to trunk 766a in the third channel, and tap-offs 764a extend upward from pins 616b to connect to trunk 766b in the third channel. Trunks 766a and 766b are both located on the second track, {track 2/2}, of the third channel. Trunks 754a and 766a are connected via spine 768a, trunks 754a and 660a are connected via redundant spines 770a and 770b, trunk 754b and 760b are connected via spine 770a, and trunks 758 and 662 are connected via spine 770a and 770b. Spines 768a, 768b, 770a and 770b are connected by a horizontal spine 772.

Connection layout 750 is described by the structural directives {intermittent backbone mirror; mirror}. Each trunk 754a, 754b, 758, 762, 766a and 766b only has tap-offs extending from one side, making it a {backbone} structure. Additionally, trunks 658a, 658b, 662a and 662b are separated because of the {intermittent} modification. Finally, similar to connection layout 650, the trunk placement in the second row is a reflection of the trunk placement in the first row across an axis through the center of the first channel, which is a {mirror} pattern. The third and fourth rows are then a reflection of the first and second rows across the central axis of the connection layout 750 (which is through the middle of the second channel). Connection layout 750 can also be described more explicitly by other structural directives.

Customizing a Connection Layout Template for Reuse

Figure 8:
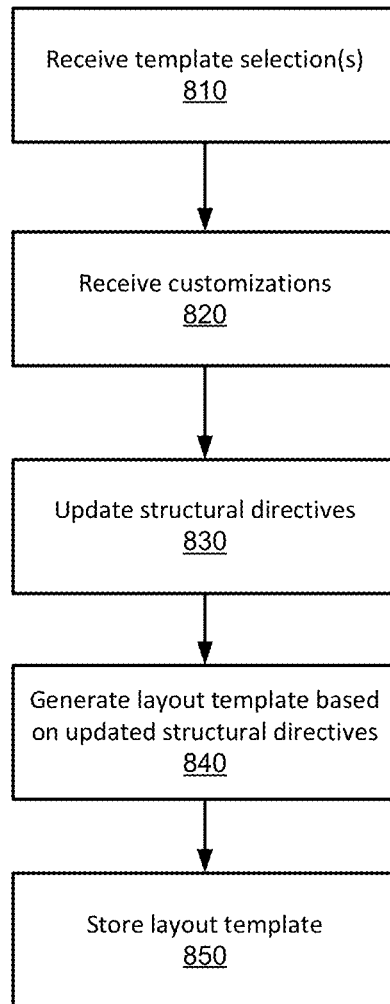
FIG. 8 is a flowchart illustrating a method for customizing an existing layout template, according to one embodiment.

FIG. 8 is a flowchart illustrating a method 800 for customizing an existing layout template, according to one embodiment. The customizable routing system 300 first receives 810 a selection of an existing layout template that is to be modified for particular connectivity information. In one embodiment, there may only be one layout template associated with that connectivity information. In that case, the submission of the connectivity information constitutes receipt 810 of the selection because there is only one option available. In other embodiments, several layout templates may be associated with the connectivity information, in which case the received 810 selection may be a user selection between multiple applicable layout templates or an automatic system selection based on achieving design objectives.

Once the layout template has been selected, the customizable routing system 300 receives 820 a customization from the designer, such as through a drawing in a graphical interface. The customizable routing system 300 then analyzes the customization to the connection layout to determine and updates 830 the structural directives associated with the layout template. The updated structural directives can then be used to route connections and/or generate 840 another layout template that is stored 850 for further use or customization in the future.

FIGS. 9A and 9B are example custom connection layouts 900 and 950 that have been customized for reuse using method 800, according to one embodiment. FIG. 9A illustrates connection layout 900, which is a customized version of connection layout 650. The customization performed to generate connection layout 900 includes removing two vertical spines, moving the two remaining vertical spines, and extending the trunks. Specifically, connection layout 900 includes spines 918a and 918b that are placed between the third and fourth pins of each row, and between the ninth and tenth pins of each row. Because there are now only two vertical spines 918a, 918b, each of the trunks 904a, 904b, 908a, 908b, 912a, 912b, 916a and 916b are extended in order to connect to the spines. Similarly, horizontal spine 922 is shorter than original horizontal spine 672 because the spines 918a, 918b are not as far apart as the spines 668a, 668b, 670a and 670b. If the space between each pin is considered to be a track, this customization can be described as {spine track 3/11 8/11}, which defines all of the vertical spines (i.e., there are no other vertical spines present in connection layout 900). Alternatively, the structural directives may define the customized vertical spines 918a, 918b in relative terms, such as between trunks 908a/912a and 904a/916a, and between trunks 904b/916b and 908b/912b.

FIG. 9B illustrates connection layout 950, which is a customized version of connection layout 750. The customization performed to generate connection layout 900 includes moving the trunks for the second and third rows to the same tracks as the trunks of the first and fourth rows, moving the two outer vertical spines and adding two additional vertical spines. Specifically, trunk 958 is placed on {track 1/2} instead of {track 2/2}, and trunk 962 is placed on {track 2/2} in the third channel instead of {track 1/2}. If there is a track through the center of each pin, the vertical spines 968a, 968b, 969a, 969b, 970a and 970b are now described as {spine track 1/12 3/12 5/12 8/12 10/12 12/12}. Horizontal spine 972 is also longer to accommodate the position of the outermost vertical spines 968a, 968b. The structural directives may similarly be defined in relative terms, such as specifying that trunks 958 and 962 are located on the default track of trunks 754a, 754b, 764a and 764b, respectively, and the modified vertical spines 968a, 968b, 970a and 970b are located at the outer edges of the corresponding trunks 754a, 754b, 766a and 766b.

FIGS. 10A and 10B are diagrams illustrating sets of custom layout templates and the corresponding schematic portions, according to one embodiment. Each schematic portion (or other type of connectivity information) can be associated with multiple layout templates. FIG. 10A indicates that schematic portion 600 is associated with connection layouts 650 and 900 because both connection layouts 650 and 900 connect the same pins of the associated connectivity diagram of FIG. 6B. The schematic portion 600 and the connection layouts 650 and 900 may collectively be considered a layout template, or the schematic portion 600 paired with connection layout 650 would be considered one layout template, and schematic portion 600 paired with connection layout 900 would be considered another layout template. FIG. 10B indicates that schematic portion 700 is associated with connection layouts 750 and 950 because both connection layouts 750 and 950 connect the same pins of the associated connectivity diagram of FIG. 7B. Similarly, the schematic portion 700 and connection layouts 750 and 950 may be considered a layout template collectively or in schematic portion-connection layout pairs.

Automatically Adapting a Connection Layout Template for Reuse

Figure 11:
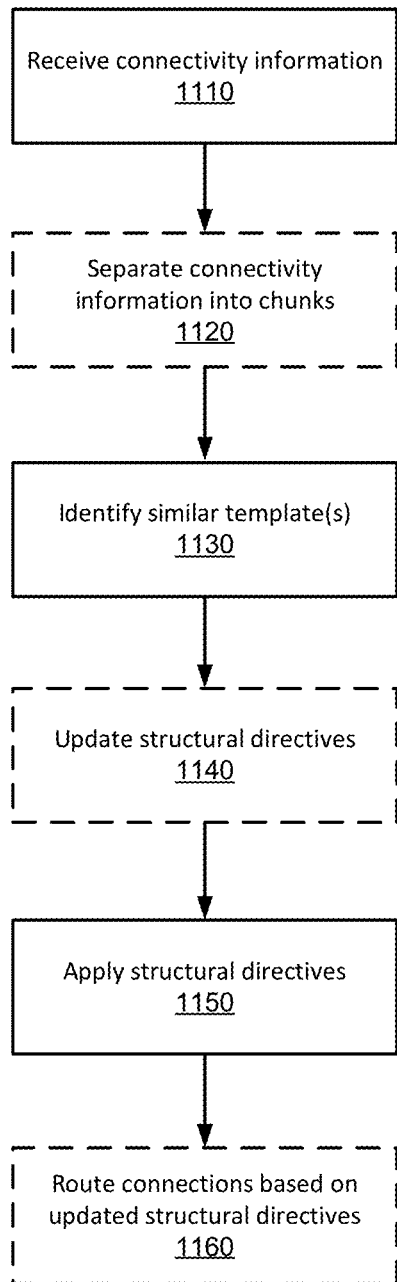
FIG. 11 is a flowchart illustrating a method for automatically adapting an existing layout template for reuse, according to one embodiment.

FIG. 11 is a flowchart illustrating a method 1100 for automatically adapting an existing layout template for reuse, according to one embodiment. The boxes with dashed lines indicate that those steps (1120, 1140, 1150, and 1170) are optional.

The customizable routing system 300 receives 1110 connectivity information for a plurality of target circuit elements of a target circuit. In some embodiments, the customizable routing system 300 separates 1120 the connectivity information for the circuit elements into a plurality of chunks, which may or may not overlap. Each chunk represents a subset of the connectivity information for the target circuit elements and may be used to match the connectivity information to multiple existing layout templates that can be combined to achieve the connectivity of the target circuit elements. FIG. 13B illustrates example chunks.

Figure 12A:
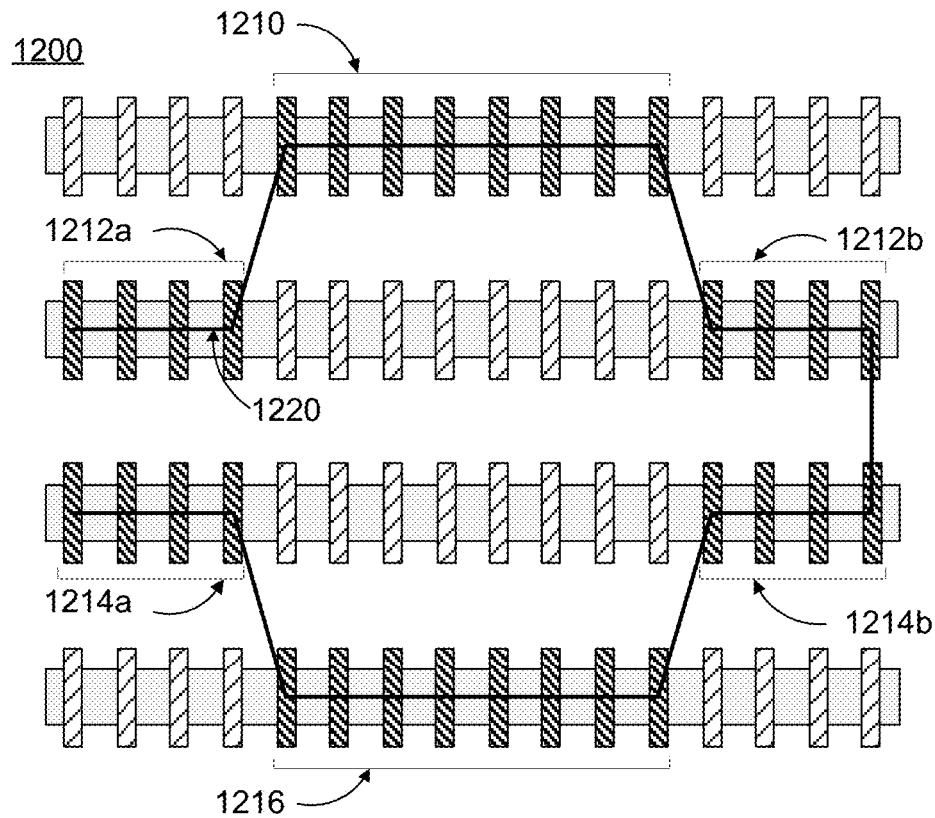
FIG. 12A is a connectivity diagram that differs from that of existing layout templates that are available for reuse, according to a first embodiment.

The customizable routing system 300 identifies 1130 one or more similar layout templates that can be applied to the plurality of target circuit elements (or chunks). The one or more similar layout templates may be "similar," for example, by having connectivity information that matches or can be scaled to match that of the target circuit elements or a chunk thereof. FIG. 12A illustrates an example of scaling. The customizable routing system 300 determines the connectivity differences between the one or more similar layout templates and updates 1140 the structural directives for the layout templates, if necessary.

The customizable routing system applies 1150 structural directives (or updated 1140 structural directives, if applicable) to the received 1110 connectivity information, which can then be used to route 1160 the plurality of circuit elements.

FIG. 12A is a connectivity diagram 1200 that differs from that of existing layout templates that are available for reuse, according to a first embodiment. Connectivity diagram 1200 has four rows of 16 pins each. Line 1220 indicates that pins 1210, 1212a, 1212b, 1214a, 1214b and 1216 are to be connected. The customizable routing system 300 receives this connectivity diagram 1200, which does not match either of the previously mentioned connectivity diagrams. However, the customizable routing system 300 can analyze this connectivity information, and determine that it is a horizontally-scaled version of the connectivity diagram of FIG. 6B.

In this context, horizontally-scaled means that the general connectivity pattern and number of rows remain the same, but the number of pins per row have increased in a scaled manner. For example, in the connectivity diagram 1200, each group of four pins corresponds to each group of three pins in the connectivity diagram of FIG. 6B. Specifically, there are eight pins 1210 that correspond to six pins 610, four pins 1212*a* that correspond to three pins 612*a*, four pins 1212*b* that correspond to three pins 1212*b*, four pins 1214*a* that correspond to three pins 614*a*, four pins 1214*b* that correspond to three pins 1214*b*, and eight pins 1216 that correspond to six pins 610. Thus, connectivity diagram 1200 scaled 4/3 in the horizontal direction (number of pins) relative to the connectivity diagram of FIG. 6B. A connectivity diagram can similarly be scaled in the vertical direction based on the number of rows rather than the number of pins per row.

Based on this analysis and determination, the custom batch router system 300 can adapt a layout template corresponding to the connectivity diagram of FIG. 6B. Using the layout template with connection layout 900, the customizable routing system 300 determines that the primary structural adjustments it needs to make is changing {vertical spine 3/11, 8/11} to {vertical spine 4/15, 11/15}. Alternatively, the spines may be defined in relative terms (such as those described in conjunction with FIGS. 9A and 9B), in which case no structural adjustments are necessary.

Figure 12B:
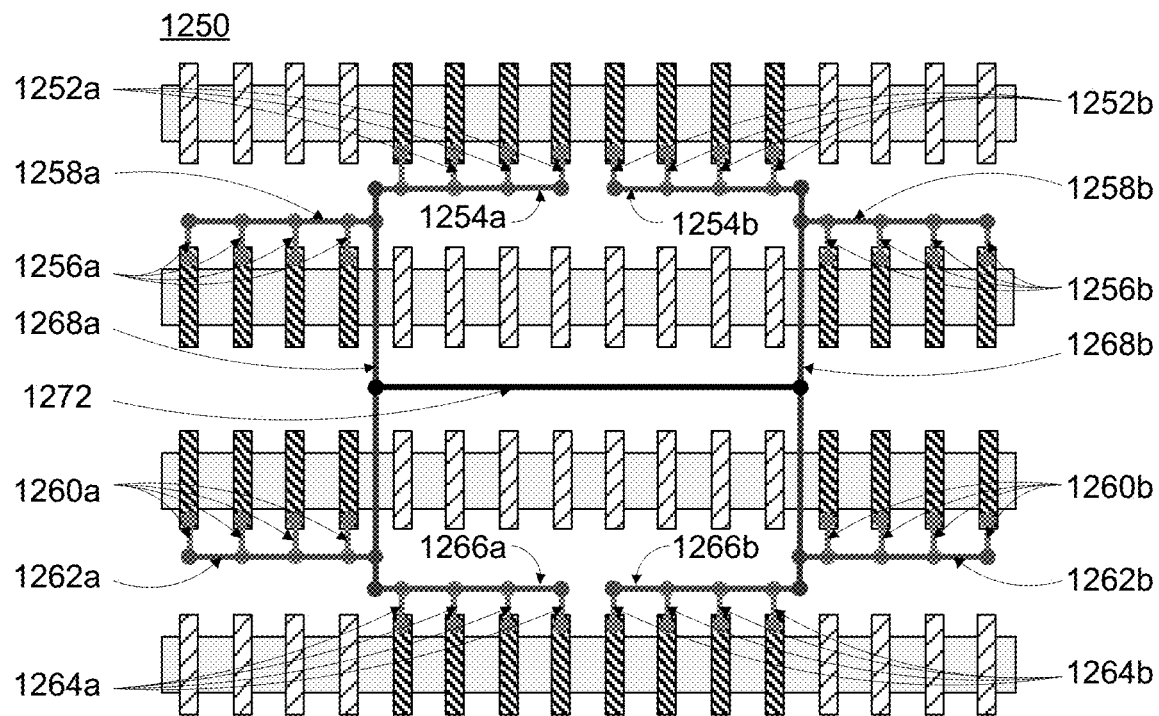
FIG. 12B is a layout diagram illustrating a connection layout corresponding to the connectivity diagram of FIG. 12A, according to the first embodiment.

The customizable routing system 300 updates the structural directives accordingly and produces a corresponding connection layout 1250, as shown in FIG. 12B.

The connection layout 1250 of FIG. 12B replicates connection layout 900 at 4/3 horizontal scaling. Tap-offs 1252*a*, 1252*b*, 1256*a*, 1256*b*, 1260*a*, 1260*b*, 1264*a* and 1264*b* correspond to tap-offs 652*a*, 652*b*, 656*a*, 656*b*, 660*a*, 660*b*, 664*a* and 664*b*, respectively. Trunks 1254*a*, 1254*b*, 1258*a*, 1258*b*, 1262*a*, 1262*b*, 1266*a* and 1266*b* correspond to trunks 904*a*, 904*b*, 908*a*, 908*b*, 912*a*, 912*b*, 916*a* and 916*b*, respectively. Spines 1268*a*, 1268*b* and 1272 correspond to spines 918*a*, 918*b* and 922, respectively. Despite being a different size (and thus having different connectivity information) than connection layout 900, connection layout 1250 maintains the structural aspects of connection layout 900. Specifically, connection layout 1250 only has two vertical spines 1268*a*, 1268*b*, which are located between (1) trunks 1256*a*/1262*a* and trunks 1254*a*/1266*a*, and (2) trunks 1254*a*/1266*b* and 1258*b*/1262*b*.

Figure 13A:
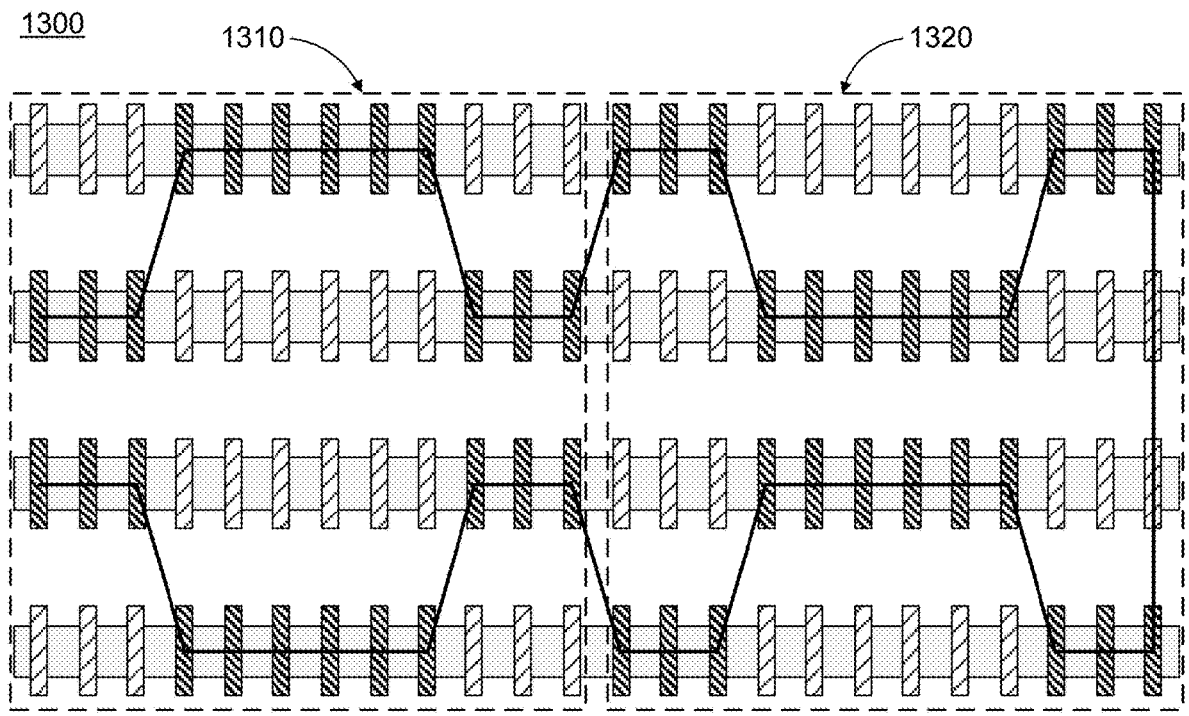
FIG. 13A is a connectivity diagram that differs from that of existing layout templates that are available for reuse, according to a second embodiment.
Figure 13B:
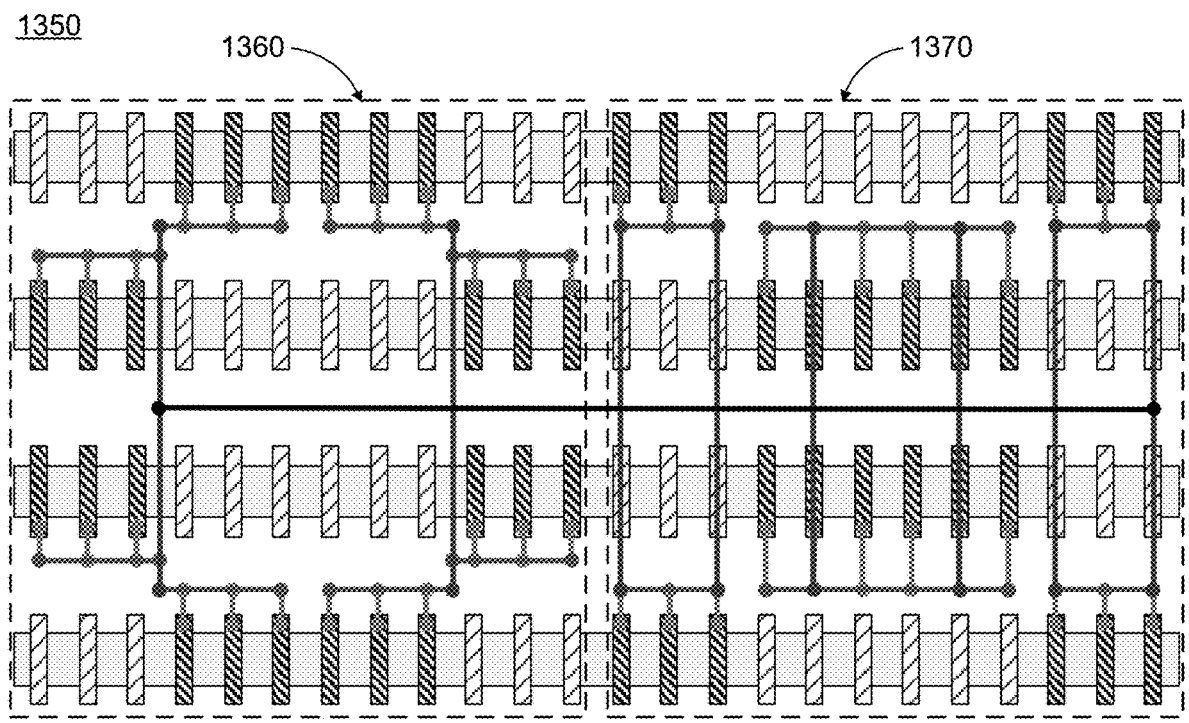
FIG. 13B is a layout diagram illustrating a connection layout corresponding to the connectivity diagram of FIG. 12A, according to the second embodiment.

FIG. 13A is another connectivity diagram 1200 that differs from that of existing layout templates that are available for reuse, according to a second embodiment. Connectivity diagram 1300 has four rows of 24 pins. The customizable routing system 300 analyzes connectivity diagram 1300 and determines that it can split it into two chunks 1310 and 1320 that each correspond to existing layout templates. Chunk 1310 matches the connectivity of the connectivity diagram of FIG. 6B, and chunk 1320 matches the connectivity of the connectivity diagram of FIG. 7B. The customizable routing system 300 retrieves the structural directives for the corresponding connection layouts 900 and 950, determines that the only modification it needs to apply is combining horizontal spines 922 and 972 and modifies the structural directives appropriately. The customizable routing system 300 then generates the connection layout 1350 of FIG. 13B by applying connection layout 900 to chunk 1310 to generate one half 1360 of the connection layout 1350, applying connection layout 950 to chunk 1320 to generate the other half 1370 of connection layout 1350, and connecting the two horizontal spines.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for designing an integrated circuit, comprising:
   receiving at least one first layout template representing a physical layout of connections associated with one or more source circuit elements of a source circuit;
   receiving one or more structural directives corresponding to the at least one first layout template, each of the one or more structural directives describing a different property of the physical layout of connections associated with the one or more source circuit elements;
   receiving connectivity information for a plurality of target circuit elements of a target circuit;
   identifying one or more second layout templates representing a physical layout of connections associated with one or more of the target circuit elements by comparing the connectivity information for the target circuit elements with the physical layout of connections associated with the one or more source circuit elements;
   updating the one or more structural directives such that each of the one or more updated structural directives describes a different property of the physical layout of connections associated with the one or more target circuit elements; and
   applying the one or more updated structural directives of the identified one or more second layout templates to the one or more target circuit elements of the target circuit for routing the one or more target circuit elements.

2. The method of claim 1, further comprising:
   identifying one or more modifications to the one or more second layout templates relative to the at least one first layout template;
   revising the one or more structural directives of the identified one or more second layout templates according to the one or more modifications; and
   applying the revised one or more structural directives for routing the one or more target circuit elements.

3. The method of claim 2, wherein the one or more modifications comprise adding one or more redundant connections to the at least one first layout template.

4. The method of claim 2, wherein identifying the one or more modifications comprises:
   determining one or more differences between a subset of the connectivity information for the one or more target circuit elements and the physical layout of connections associated with the one or more source circuit elements.

5. The method of claim 2, further comprising:
storing the revised one or more structural directives as the one or more second layout templates for a subset of the connectivity information for the one or more target circuit elements.

6. The method of claim 1, wherein at least a subset of the connectivity information for the one or more target circuit elements matches the physical layout of connections associated with the one or more source circuit elements.

7. The method of claim 1, wherein a plurality of the identified one or more second layout templates represents the physical layout for the one or more source circuit elements.

8. The method of claim 1, further comprising:
dividing the connectivity information for the target circuit elements into a plurality of chunks,
wherein each identified second layout template of the one or more second layout templates corresponds to a respective chunk of the plurality of chunks.

9. The method of claim 8, wherein one or more of the plurality of chunks matches the physical layout of connections associated with the one or more source circuit elements.

10. The method of claim 1, wherein a subset of the connectivity information for the one or more target circuit elements is a scaled version of connectivity information related to the physical layout of connections associated with the one or more source circuit elements.

11. A non-transitory computer-readable medium comprising computer-executable instructions that, when executed by one or more processors, cause the one or more processors to:
receive at least one first layout template representing a physical layout of connections associated with one or more source circuit elements of a source circuit;
receive one or more structural directives corresponding to the at least one first layout template, each of the one or more structural directives describing a different property of the physical layout of connections associated with the one or more source circuit elements;
receive connectivity information for a plurality of target circuit elements of a target circuit;
identify one or more second layout templates representing a physical layout of connections associated with one or more of the target circuit elements by comparing the connectivity information for the target circuit elements with the physical layout of connections associated with the one or more source circuit elements;
update the one or more structural directives such that each of the one or more updated structural directives describes a different property of the physical layout of connections associated with the one or more target circuit elements; and
apply the one or more updated structural directives of the identified one or more second layout templates to the one or more target circuit elements of the target circuit for routing the one or more target circuit elements.

12. The computer-readable medium of claim 11, wherein the instructions further cause the one or more processors to:
identify one or more modifications to the one or more second layout templates relative to the at least one first layout template;
revise the one or more structural directives of the identified one or more second layout templates according to the one or more modifications; and
apply the revised one or more structural directives for routing the one or more target circuit elements.

13. The computer-readable medium of claim 12, wherein the one or more modifications comprise adding one or more redundant connections to the at least one first layout template.

14. The computer-readable medium of claim 12, wherein the instructions further cause the one or more processors to:
determine one or more differences between a subset of the connectivity information for the one or more target circuit elements and the physical layout of connections associated with the one or more source circuit elements.

15. The computer-readable medium of claim 12, wherein the instructions further cause the one or more processors to:
store the revised one or more structural directives as the one or more second layout templates for a subset of the connectivity information for the one or more target circuit elements.

16. The computer-readable medium of claim 11, wherein at least a subset of the connectivity information for the one or more target circuit elements matches the physical layout of connections associated with the one or more source circuit elements.

17. The computer-readable medium of claim 11, wherein a plurality of the identified one or more second layout templates represents the physical layout for the one or more source circuit elements.

18. The computer-readable medium of claim 11, wherein the instructions further cause the one or more processors to:
divide the connectivity information for the target circuit elements into a plurality of chunks,
wherein each identified second layout template of the one or more second layout templates corresponds to a respective chunk of the plurality of chunks.

19. The computer-readable medium of claim 18, wherein one or more of the plurality of chunks matches the physical layout of connections associated with the one or more source circuit elements.

20. The computer-readable medium of claim 11, wherein a subset of the connectivity information for the one or more target circuit elements is a scaled version of connectivity information related to the physical layout of connections associated with the one or more source circuit elements.

* * * * *